INVENTOR.
C. Herman Davis
BY
ATTORNEY.

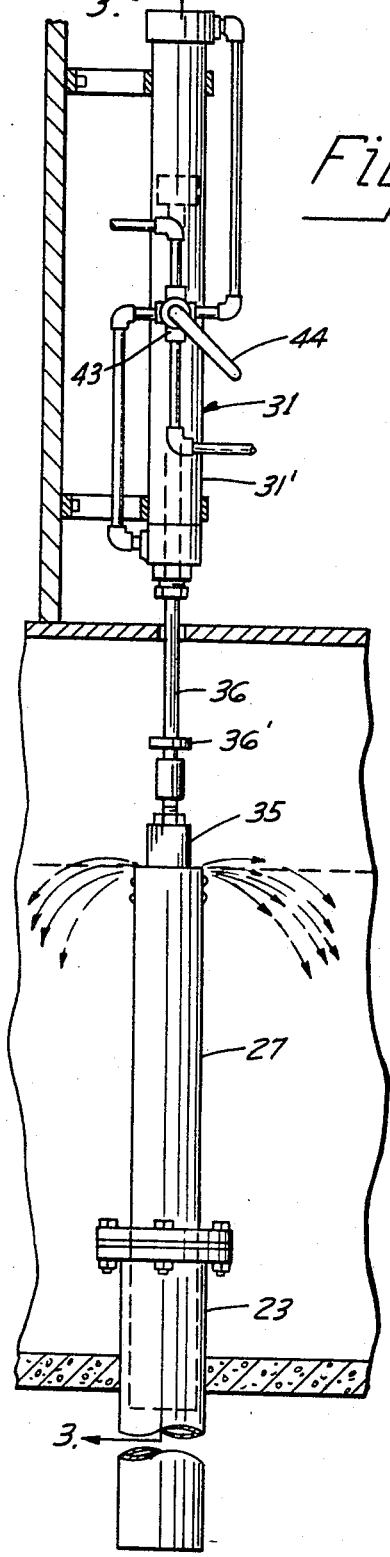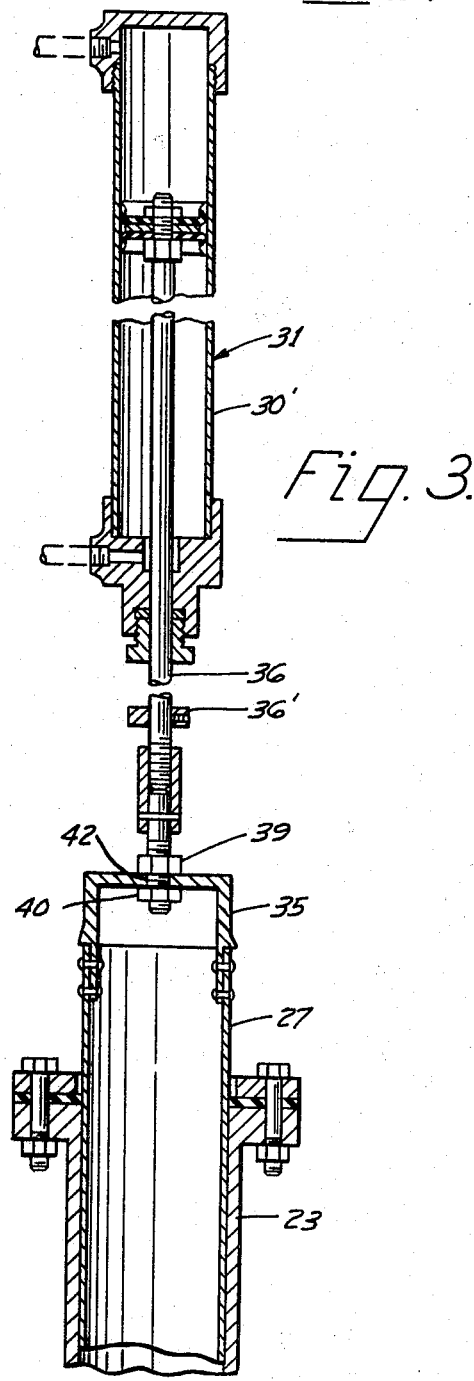

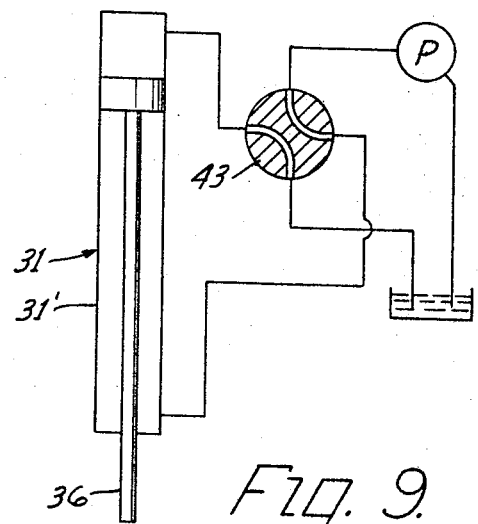
Fig. 9.
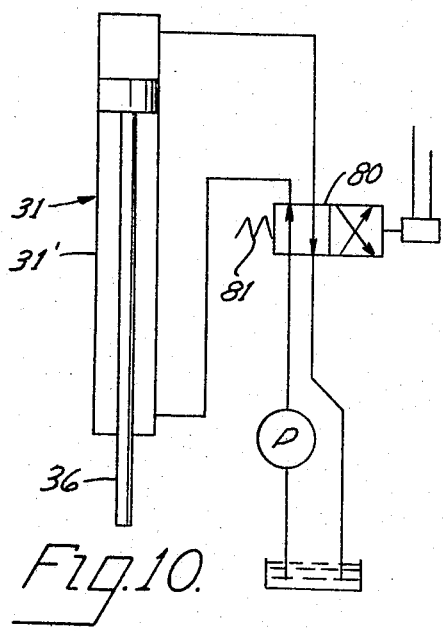
Fig. 10.
Fig. 11.
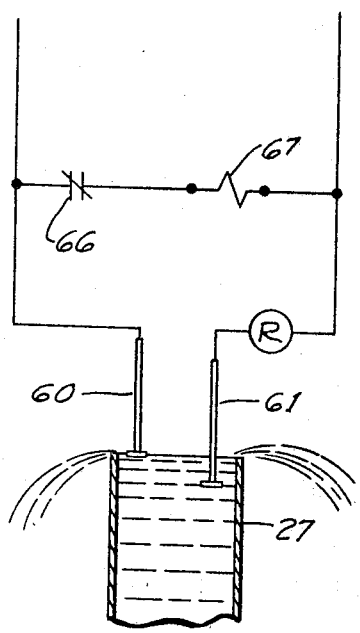
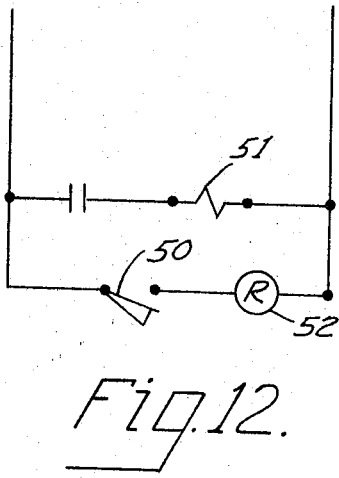
Fig. 12.

United States Patent Office 3,429,441
Patented Feb. 25, 1969

3,429,441
CONTROL MEANS FOR SLUDGE REMOVAL
Charles Herman Davis, 54 N. Prospect St.,
Lorain, Ohio 44052
Filed Aug. 9, 1966, Ser. No. 571,348
U.S. Cl. 210—109    7 Claims
Int. Cl. B01d 21/24

ABSTRACT OF THE DISCLOSURE

Apparatus for the removal of sludge from settling tanks in water and sewage treatment plants including remote controlled hydraulic operated slip tubes having means to sense the fluid flow and adjust the tubes in response to the sensed condition.

---

My invention relates to water and sewage treatment and relates more particularly to improved control means for the operation of "slip tubes" for sludge removal.

An object of my invention is the provision of improved means for operating "slip tubes" or "valves" for sludge removal.

A further object of my invention is to provide for remote control of said sludge removal means.

A further object of my invention is to provide apparatus for the removal of sludge from the settling tank in water and sewage treatment plants wherefore the operator can control the operation of said sludge removal devices at a point removed therefrom.

A further object of my invention is to operate the sludge removal apparatus by means of available plant water pressure.

A further object of my invention is to provide an improved control means for sludge removal which removes the sludge from drainage lines in the water or sewage treatment plants with a minimum of water in minimum time.

An important advantage of this invention resulting from its use of a minimum amount of water from the plant for removing the sludge is that it delivers the sludge in more concentrated form to the lagoons or digesters, with savings in space and in the case of digesters, savings in the amount of heat required.

In water treatment important economies are further effected by the improved sludge removal means of this invention, in the savings of treated water as well as space, etc.

A further object of the invention is therefore the provision of improved sludge removal means effecting greater economies and greater efficiency in plant operation.

A still further object is the provision of control means for removal of sludge in water or sewage treatment plants which are relatively inexpensive to manufacture, highly efficient and durable in use.

Other objects of my invention and the invention itself will become more readily apparent by reference to the accompanying drawings, in which drawings:

FIGURE 2 is an enlarged view of one form of the improved sludge removing apparatus of my invention;

FIGURE 3 is a sectional view taken on the line 3—3 of FIGURE 2;

FIGURE 9 is a schematic view of the operation of the manually operable control means of the form of my invention shown in FIGURES 2 and 3;

FIGURE 10 is a schematic view of the control means of the embodiment disclosed in FIGURES 4 and 5;

FIGURE 11 is an electrical diagram showing the operation the embodiment of FIGURE 6; and FIGURE 12 is a diagrammatic view showing a switching arrangement used in the embodiment of FIGURES 4 and 5.

Figure 1:
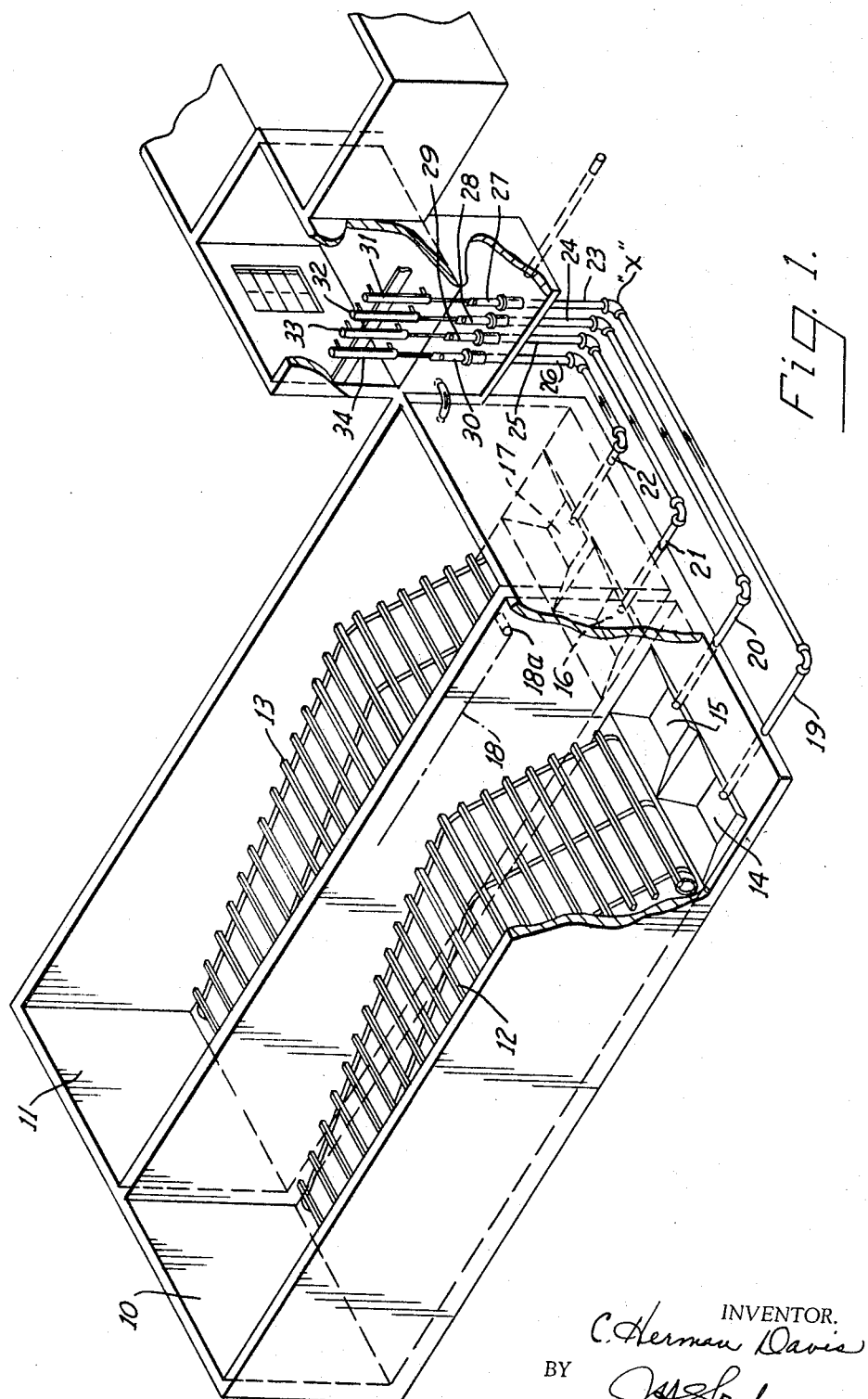
FIGURE 1 is a perspective view of portions of a water or sewage treatment plant disclosing sludge removing settling tanks and a pumping station, the plant water level being indicated thereon.

Referring now to the drawings, in all of which like parts are designated by like reference characters, it is to be understood that in the prior art, with which I am familiar, sludge in settling tanks in water and sewage treatment plants is collected by different means generally at an end of such settling tanks and is withdrawn therefrom through drains and the like. The drains deliver the sludge to a remote location and normally the same is adapted to be flushed from the drains by means of hand wheel operated "slip valves" or "slip tubes," water in the line floating the sludge upwardly through the tubes, the floating sludge at the point of egress from the tube overflowing into a digester in the case of a sewage treatment plant or to an externally located lagoon or the like in the case of a water plant. The floating sludge is accompanied by undesirable odors. Further, the hand wheel operation is slow and is uneconomical requiring large amounts of water for pumping the sludge.

The improved control means for sludge removal of my invention may automatically or manually actuate open ended cylinders of slip tubes of the type shown in the prior art but dispenses with the use of hand wheels. The operation of said improved control means further may be effected either at the point of overflow or at a location remote thereto, as for example, a separate room, etc. in the water and sewage treatment plant. The operator is thus able to be situated in an odor-free location unexposed to inclement weather.

In FIGURE 1, I have shown at the left of the drawing a pair of sludge removing settling tanks 10, 11; conveyor-type sludge collectors 12, 13, longitudinally disposed therein adapted to scrape the solids and sludge settling on the bottom of the said tanks and to deliver the same from the said tanks to recessed wells, hoppers or the like 14, 15, 16 and 17 located generally at an end thereof.

It will be noted that the level of water in the tanks does not exceed the plant water level indicated at 18 and that overflow means 18a are provided for this purpose.

Sludge from the hoppers, etc. 14, 15, 16 and 17 is carried by gravity through lines or drains 19, 20, 21, 22 respectively, to fixed cylinder or standpipes 23, 24, 25, 26, respectively, situated below the plant level and coupled to the lines as shown at $x$. The collected sludge and water is drawn through the lines 19, 20, 21 and 22, and the standpipes 23, 24, 25 and 26, by preferably simultaneous reciprocal actuation of the open ended slip tubes 27, 28, 29 and 30 telescopically fitted within the standpipes 23, 24, 25 and 26, and said "slip tubes" are adapted to project above the plant level. The slip tubes are manually actuated, in the form of FIGURES 1, 2, 3, by hydraulic means associated therewith indicated at 31, 32, 33, 34. In FIGURES 2 and 3 the slip tube 27 is shown provided with a bail 35 to which a piston rod 36 slidably mounted in a hydraulic cylinder 31' is connected as by nuts 39 and 40. A stop collar 36' is secured to the rod 36 and limits the range of movement of the rod and associated slip tube. In the form shown each piston rod is provided with a threaded end 41 and a pair of nuts 39, 40 threaded thereon on opposite sides of a centrally disposed opening 42 in the bail secures the rod to the bail. The cylinder is, as shown, provided with a four-way valve 43 operated, in this form of the invention, by means of a handle 44 wherefore the respective assembled piston rods and slip tubes are caused to travel a predetermined amount either upwardly or downwardly as dictated by plant water level. The variations in water level between the plant level indicated at 18 and the level in the standpipes 23, 24, 25, 26, determines the velocity of the flow and the invention contemplates adjustment of the slip tube by the manually operated or automatically operated means disclosed to quickly and efficiently secure a proper mixture of sludge and water from the lines, only the minimum amount of water required for the purpose of expelling the sludge being utilized. Where automatically operated means are used, the sludge is continuously drained as it collects from the plant.

In all forms of my invention, the slip open-ended tubes are caused to vertically reciprocate with respect to the fixed cylinders or standpipes by means of hydraulic means and the controls may be mounted adjacent the hydraulic means or remote therefrom as hereafter more fully described.

Figure 4:
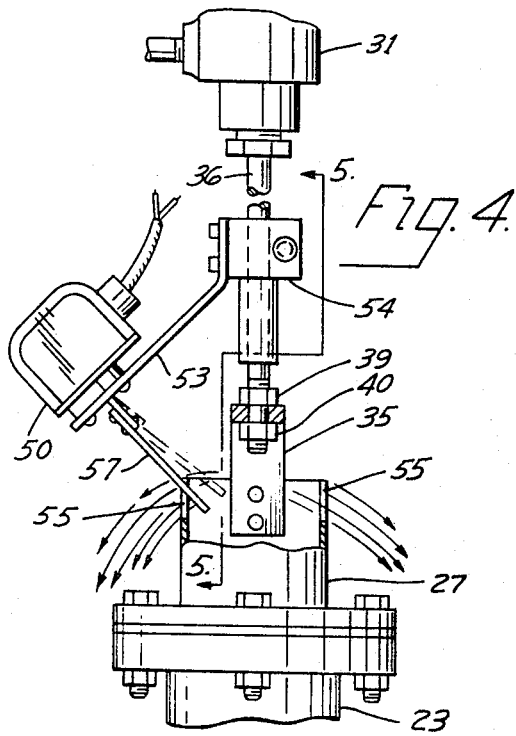
FIGURE 4 is a side plan view of a further embodiment of my invention.
Figure 6:
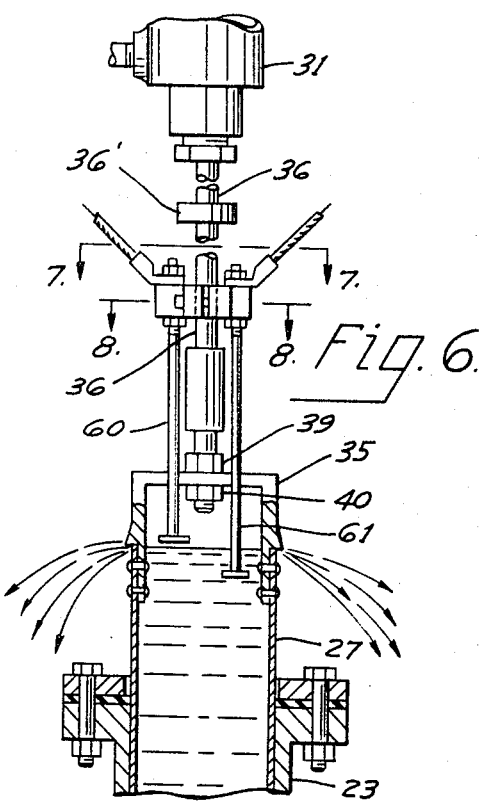
FIGURE 6 is a sectional view of another embodiment of my invention.

FIGURES 1, 2 and 3 disclose a manually operated control and FIGURES 4 and 6 inclusive disclose automatically operated control means for continuous removal of sludge. The four-way valves in the form of FIGURES 1, 2 and 3 mounted on the hydraulic cylinder may be mounted remote thereto, as on a panel inside the building away from the penetrating odor and exposure to weather, the panel being positioned at a location where the operation of the hydraulic means and slip tubes can be observed. When the handle 44 shown in FIGURES 1-3 is turned, a pump such as indicated at P in FIGURE 9 is used to pump liquid, usually antifreeze stored in a separate reservoir, pumped from and returned to the reservoir, under pressure into and through the four-way valving indicated at 43 into the hydraulic cylinder 31' to reciprocally actuate the piston rod 36. To drain the cylinder, the handle 44 is turned in an opposite direction. It is to be understood that, the anti-freeze can be optionally added to liquid being pumped, as required. When the pump is placed in a remote location, it is necessary that the lines from the hydraulic cylinders from the building be provided with connections to ensure two-way flow.

Figure 5:
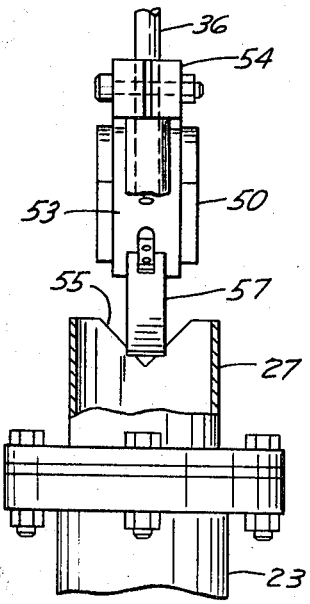
FIGURE 5 is a fragmentary view taken on the line 5—5 of FIGURE 4.

Automatic operation of the slip tubes for removal of sludge from the lines, can be effected by different means. In the drawings a first embodiment is shown in FIGURES 4 and 5. The control means for operating the slip tube 27 in this form includes a flow switch 50 wired in series with a source of power, A.C. or D.C. current, a solenoid holding coil 51; solenoid controlled valving 80 being substituted for the manual valves 43 of the previous form of the invention, and a switch operating relay 52, as shown. The flow switch 50 is, in this form, supported by a generally L-shaped bracket 53 mounted on an insulating block or sleeve 54 secured to the piston rod 36 and as shown extends laterally therefrom. Secured to the underside of said bracket is a paddle or flexible member 57 which is disclosed disposed through a V-shaped notch 55 in an upper portion of the side wall of the open ended slip tube 27 and said member 57 is disposed at an oblique angle to the rod.

Upward and down movement of the slip tube 27 is, in this form of the invention, governed by the amount of material discharged on the paddle 57. The rate of sludge discharge is adjustable. As disclosed, the flow switch operates according to the level of the fluid in the pipe and energizes and de-energizes the solenoid controlled valving 80 to actuate the hydraulic means to reciprocate the rod and slip tube assemblies. Hence it can be observed the piston operated slip tube in this form of my invention can be operated similarly to that attained by the form of FIGURES 1, 2 and 3.

Figure 7:
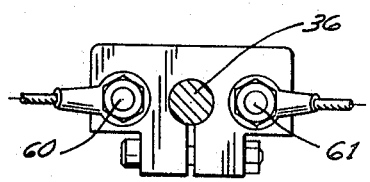
FIGURE 7 is a view taken from the line 7—7 of FIGURE 6.
Figure 8:
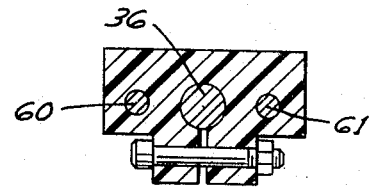
FIGURE 8 is a view taken from the line 8—8 of FIGURE 6.

In the automatic control means of my invention shown in FIGURES 6, 7 and 8, operated according to either FIGURE 11 or 10, two electrodes and a relay are employed. The shorter of the two electrodes shown at 60 energizes a relay coil 67, connected to a longer electrode 61, and the connection is maintained until the longer electrode 60 is lifted out of the sludge by upward movement of the piston rod connected thereto. When the solenoid switch 66 is tripped thereby, the relay coil R is de-energized and the electrodes 60, 61 which are secured by an insulated block or the like to the piston rod 36 and thus travel with the tube 27, which is moved downwardly and their downward movement continues until the short electrode 60 contacts liquid in the tube whereupon the relay coil R is energized and the upward cycle started again. In this form of my invention, the tube may be provided with either a straight top or notched sides, as in the form of my invention shown in FIGURES 4 and 5. The relay coil R, in this form of my invention, is de-energized and the solenoid coil energized during downward movement of the slip tube. When the relay coil R is energized upon the shorter of the electrodes touching the liquid in the tube, the solenoid is de-energized and the tube begins the upward movement.

Variations in plant level, it will be understood, determine the velocity of the flow through the pipes. The slip tube is, as stated hereinbefore, in all embodiments of the invention adapted to be disposed above the plant level; when the tube reaches plant level, sludge material in the standpipe is expelled, if sufficiently diluted; if the sludge is in a more concentrated form, the slip tube is lowered further, manually as in the form of FIGURES 1, 2 and 3, or automatically, as in the forms of FIGURES 4, 5 and 6 to 8 inclusive, to increase the difference in head, thus assisting in greater flow. Hydraulic means, either manually or automatically actuated, at the location of the slip tubes or remote thereto, are used in all forms of the invention to reciprocally actuate the slip tubes for removing sludge from the standpipes, etc. drains, collectors.

In the forms of my invention disclosed in FIGURES 4, 5, 6, 7 and 8, it is contemplated that the solenoid valves be spring returned as shown at 81 and when the power is off, pistons and associated slip tubes are preferably automatically returned to top position.

Although I have described my invention in terms of the particular embodiments herein illustrated and described, it will be understood that modifications might be made without departing from the spirit or scope of my invention.

I claim:

1. Apparatus for use in controlling slip tubes in a water or sewage treatment plant, consisting of means to control the level of the water in the plant, sludge collectors in the lower portion of the plant, standpipes having their lower ends located below the plant water level, connections from the sludge collector to said standpipes for carrying sludge thereto, open-ended slip tubes having upper portions thereof located above the plant water level and telescoped within respective said standpipes, hydraulic means for actuating said slip tubes vertically within their respective standpipes to expel sludge from said standpipes, each of said slip tubes being adapted to be lowered within its standpipe to create a difference in head to increase the flow of sludge from the said standpipes.

2. Apparatus as claimed in claim 1 wherein each of said hydraulic means is provided with a piston rod, which rod is secured to each said slip tube, means for actuating said hydraulic means and said slip tubes as dictated by the plant water level.

3. Apparatus as claimed in claim 2 wherein means are provided for limiting the range of movement of each said rod and slip tube.

4. Apparatus as claimed in claim 3 wherein adjustment means are provided for the slip tube to ensure the explusion of a determinate mixture of sludge and water from the standpipe.

5. Apparatus as claimed in claim 1 wherein the means for actuating the slip tubes are located remotely of the hydraulic means and assocaited slip tubes.

6. Apparatus for use in controlling slip tubes in a water or sewage treatment plant, consisting of means to control the level of the water in the plant, sludge collectors in the lower portion of the plant, standpipes having their lower ends located below the plant water level, connections from the sludge collector to said standpipes for carrying sludge thereto, open-ended slip tubes having upper portions thereof located above the plant water level and telescoped within respective said standpipes, hydraulic means for actuating said slip tubes vertically within their respective standpipes to expel sludge from said standpipes, each of said slip tubes being adapted to be lowered within its standpipe to create a difference in head to increase the flow of sludge from the said standpipes, comprising control means for actuating said slip tubes including a flow switch receiving current from a source of power, the flow switch being mounted on a piston rod operated by said hydraulic means extending laterally therefrom, a flexible paddle member secured to said flow switch and disposed at an angle to said piston rod, said slip tube provided with an opening in its upper side wall, vertical movement of the slip tube in said standpipe being controlled by the flow switch according to the amount of sludge material passing over the flexible paddle member.

7. Apparatus for use in controlling slip tubes in a water or sewage treatment plant, consisting of means to control the level of the water in the plant, sludge collectors in the lower portion of the plant, standpipes having their lower ends located below the plant water level, connections from the sludge collector to said standpipes for carrying sludge thereto, open-ended slip tubes having upper portions thereof located above the plant water level and telescoped within respective said standpipes, hydraulic means for actuating said slip tubes vertically within their respective standpipes to expel sludge from said standpipes, each of said slip tubes being adapted to be lowered within its standpipe to create a difference in head to increase the flow of sludge from the said standpipes, wherein each of said hydraulic means is provided with a piston rod, which rod is secured to each said slip tube, means for actuating said hydraulic means and said slip tubes as dictated by the plant water level, wherein a pair of electrodes and a relay are employed, said electrodes being of different lengths and mounted within said slip tubes and vertically movable therein, means whereby when the relatively shorter of the two electrodes touches liquid in the standpipe the slip tube and piston rod are caused to ascend.

References Cited

UNITED STATES PATENTS

| | | | |
|---|---|---|---|
| 1,820,976 | 9/1931 | Imhoff | 210—526 X |
| 2,140,059 | 12/1938 | Simonsen | 210—109 |
| 2,264,912 | 12/1941 | Kupper | 210—526 X |

FOREIGN PATENTS 412,653  7/1934  Great Britain.

REUBEN FRIEDMAN, *Primary Examiner.*

J. ADEE, *Assistant Examiner.*

U.S. Cl. X.R.

210—137, 524

UNITED STATES PATENT OFFICE
CERTIFICATE OF CORRECTION

Patent No. 3,429,441                                                                  February 25, 1969

Charles Herman Davis

It is certified that error appears in the above identified patent and that said Letters Patent are hereby corrected as shown below:

In the heading to the printed specification, line 4, "Lorain Ohio 44052" should read -- Oberlin, Ohio 44074 --.

Signed and sealed this 29th day of December 1970.

(SEAL)
Attest:

Edward M. Fletcher, Jr.

Attesting Officer

WILLIAM E. SCHUYLER, JR.

Commissioner of Patents